United States Patent [19]

Fujita et al.

[11] 4,340,839

[45] Jul. 20, 1982

[54] ZINC SULFIDE CERAMIC MATERIAL AND CATHODE RAY TUBES USING THE SAME

[75] Inventors: Yosuke Fujita, Ashiya; Fumio Fukushima, Moriguchi; Yoji Fukuda, Hirakata; Tsuneharu Nitta, Katano, all of Japan

[73] Assignee: Matsushita Electric Industrial Co., Ltd., Kadoma, Japan

[21] Appl. No.: 105,862

[22] Filed: Dec. 20, 1979

[30] Foreign Application Priority Data

Dec. 27, 1978 [JP] Japan .................................. 53-165776
Jun. 11, 1979 [JP] Japan .................................. 54-73423

[51] Int. Cl.³ ...................... H01J 29/20; C04B 35/00; C09K 11/10
[52] U.S. Cl. ............................. 313/466; 252/301.6 S; 313/467; 501/2
[58] Field of Search ............................. 313/467, 466; 252/301.6 S; 106/39.5

[56] References Cited

U.S. PATENT DOCUMENTS

| 2,774,682 | 12/1956 | Larach | 313/466 X |
| 2,866,116 | 12/1958 | Ranby | 252/301.6 S X |
| 3,497,749 | 2/1970 | Bushey | 313/467 |
| 3,704,232 | 11/1972 | Frey et al. | 252/301.6 S |
| 4,035,819 | 7/1977 | Nitta et al. | 252/301.6 S X |
| 4,038,205 | 7/1977 | Minnier et al. | 252/301.6 S |
| 4,041,140 | 8/1977 | Nitta et al. | 252/301.6 S X |

FOREIGN PATENT DOCUMENTS 50-14707 2/1975 Japan .
50-14708 2/1975 Japan .

OTHER PUBLICATIONS

"Sintering of Zinc & Cadmium Sulphides", by P. E. D. Morgan, *Sintering & Related Phenomena*, Ed. by Kuczynski et al., Gordon & Breach Science Publishers, 1967, pp. 543-551.

"An Introduction to Luminescence of Solids", by H. W. Leverenz, John Wiley & Sons, Inc., pp. 65-66.

*Primary Examiner*—Palmer C. Demeo
*Attorney, Agent, or Firm*—Cushman, Darby & Cushman

[57] ABSTRACT

Highly densed zinc sulfide ceramic materials, which essentially comprise zinc sulfide and alkali metals and/or alkaline earth metals and impurities acting as luminescent center, and which show a high brightness of cathode luminescence under irradiation of electron beam having a low energy, are easily made in the form of the sintered material, by heating the mixture of the said materials in inert or sulfuring atmosphere.

15 Claims, 4 Drawing Figures

F I G. 2
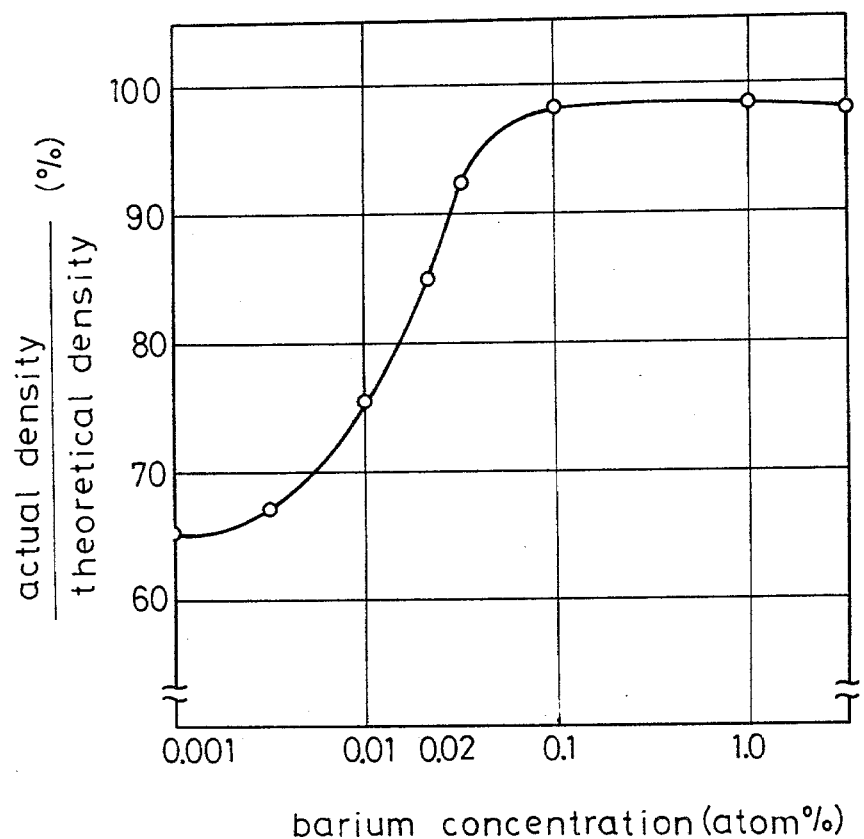

ZINC SULFIDE CERAMIC MATERIAL AND CATHODE RAY TUBES USING THE SAME

BACKGROUND OF THE INVENTION

1. Field of the Invention

The present invention relates to a zinc sulfide sintered ceramic material and cathode ray tubes using the same.

More particularly, the present invention relates to a zinc sulfide sintered ceramic luminescent screen and cathode ray tubes using the same screen as a luminescent screen.

2. Description of the Prior Art

Hitherto, zinc sulfide in powder form has been widely used as a luminescent screen in a cathode ray tube by adding a luminescent impurity or Cd to make blue, green or white luminescence; but there has been no report on use of zinc sulfide in the form of a ceramic.

In general, zinc sulfide has not been considered to be in the form of ceramic because zinc sulfide is hardly sintered except by the belowmentioned hot-press method. Consequently, zinc sulfide ceramic has not yet been used as electronic material with a difficulty of manufacturing and of high cost.

The conventional method of manufacturing zinc sulfide ceramic material is that zinc sulfide powder, with or without binder, is pressed by a pressing machine into a molded sheet; and then the sheet is heated in an inert or sulfuring atmosphere to form the sintered sheet. The zinc sulfide sheets obtained by the abovementioned process have about 60 to 70% of theoretical density (for the sheets sintered at temperatures of 1,000° to 1,200° C.). The sintered ceramic material having such a low density has a low mechanical strength and is fragile, and therefore is difficult to use as an electronics material such as cathode ray tube screen or the like. In order to manufacture practical zinc sulfide ceramic material usable as an electronic material, it is necessary that a ceramic material should have a higher density. However, zinc sulfide is liable to sublimation and decomposition during heat treatment, and therefore, it is absolutely necessary that the heat treatment in a high temperature must be made in a high pressure in an inert or sulfuring gas, and hence mass-producibility is not high.

Another method used to make zinc sulfide ceramic is press-sintering by a hot-press. By the hot-press method, a high density sintered ceramic is obtainable. However, the hot-press method requires large manufacturing equipment since it necessitates a high pressure, thereby raising the manufacturing cost in mass production.

Another method of making zinc sulfide ceramic material is proposed by the same inventors in the Japanese Patent Applications No. Sho 48-65242 and Sho 48-65244 (Japanese Patent Publications Non-examined No. Sho 50-14707 and Sho 50-14708, respectively). In the proposed method, zinc oxide is press-molded to form a zinc oxide ceramic disc, and the disc is heated in a sulfuring atmosphere such as carbon disulfide, whereby the zinc oxide disc is sulfured from the surface and then one obtains zinc sulfide sintered material. Though transferring the whole part of the disc into zinc sulfide is possible by this method, the method is preferable to use two steps of the heat treatment, namely a first step of sintering zinc oxide and a second step of sulfuring the same. Moreover, since the zinc oxide ceramic has a high density, the surface thereof is very small, and hence, the sulfuring process requires a long firing time at a high temperature, thereby increasing its manufacturing cost.

As a luminescent material for a luminescent screen in a cathode ray tube, a typical one has been zinc sulfide powder, and the luminescent screen is generally disposed between the face panel of glass and an aluminum thin film backing layer. The manufacturing method of such luminescent screen has the following four steps:

(1) depositing luminescent material powder ranging from several $\mu m$ to several tens $\mu m$ on the glass face panel by sedimentation or spraying, utilizing water glass or polyvinylalcohol as binder, (2) then after drying, coating the surface of film of the deposited luminescent material with a film of an inorganic material of for example polyvinylalcohol, (3) then vapor depositing a 1,000 to 3,000 Å thick aluminum film on the inorganic material film, and (4) finally, heating the screen made by the abovementioned process at a temperature of about 400° C., thereby decomposing and removing the inorganic binders or organic films.

Such a conventional method of forming the luminescent screen is complicated and requires a delicate and highly skilled technique of sedimentation or the like, and hence makes the manufacturing cost high. Furthermore, since a phosphor screen in general consists principally of nearly spherical particles or some deformed shape therefrom touching each other as point-contacting or contacting with very small areas, the light emitted from luminescent powder of some part and going out from the glass face panel is likely to cause considerable loss of light by dispersion, and moreover, due to absorption and dispersion by other several luminescent powder particles in the light path to the face panel an additional amount of the light is undesirably lost.

Furthermore, due to the abovementioned porous construction, the conventional luminescent screen has a poor heat radiation, thereby causing a temperature rise of the phosphor screen and hence lowering of the emission efficiency.

The aluminum film vapor-deposited on the back face of the screen is not only for reflection toward the glass face panel, but also as a conduction film for preventing undesirable charging of the luminescent screen in a negative potential. However, the aluminum screen, on the other hand, causes loss of energy of electrons which pass therethrough, and the loss is especially disadvantageous for an electron beam having low acceleration voltage, such as the power-saving type cathode ray tube. Therefore, in order to reduce the loss of the electron energy in the aluminum film, the aluminum film should be thin. However, because of the roughness formed by accumulation of luminescent powder particles at the back face of the luminescent powder screen, the reflecting aluminum film can not be formed very thin, since a thin aluminum deposition can not form a meanful continuous reflection film.

SUMMARY OF THE INVENTION

As a result of strenuous endevour made in the improvement of the luminescent screen, the inventors found the method which provides a novel luminescent screen having a very flat and smooth surface, thereby enabling one to make the very thin reflection film on it without loosing its function, resulting in an improvement in brightness at a low acceleration voltage. Further, the present invention reduces the light loss in the luminescent screen by reducing the scattering and absorption of emitted light by the particles in the luminescent screen. Furthermore, the present invention enables simplification of the manufacturing of the luminescent screen by allowing the luminescent screen to be made in a boat as a ceramic sheet independently from and outside the glass face panel.

BRIEF EXPLANATION OF THE DRAWINGS

FIG. 2 is a graph showing the relation between the concentration of Ba and density of the zinc sulfide sintered ceramic in accordance with the present invention.

DESCRIPTION OF THE PREFERRED EMBODIMENTS

Figure 1:
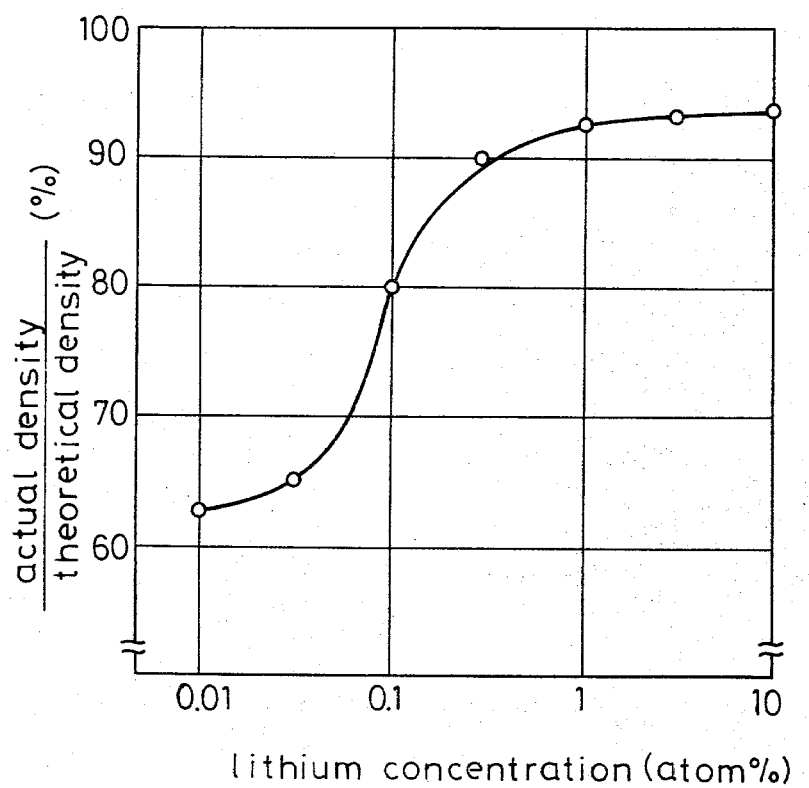
FIG. 1 is a graph showing the relation between the concentration of Li and density of the zinc sulfide sintered ceramic in accordance with the present invention.

The sintered zinc sulfide ceramic material in accordance with the present invention essentially comprises zinc sulfide and at least one element selected from the group consisting of alkali metals and alkaline earth metals.

A highly densified zinc sulfide ceramic material is sintered by heating the mixture of the said powder in an inert or sulfuring atmosphere. A most densified ceramic can be obtained with the addition of Ba.

The present invention simplifies the preparation process of the sintered zinc sulfide ceramic material. According to the invention, the ceramic can be prepared in any desired form and patterns; for example a thick film by utilizing a sheet production technique, Hence, the present invention provides a suitable technique for mass production of the sintered zinc sulfide which is applied widely in industry.

The luminescent screen of the zinc sulfide ceramic material, containing a luminescent impurity, for example, for cathode ray tubes is different from the conventional luminescent screen which consists of the luminescent powder, and has a very smooth surface. Therefore, a very thin aluminum reflection film can be formed thereon, resulting in a drastic improvement of energy loss of the electron beam accelerated at a low voltage. Consequently, the brightness of the cathode ray tube operated at the low voltage is significantly improved by the ceramic zinc sulfide screen. In addition, since the sintered ceramic luminescent material has a dense and uniform constitution, the light emitted in the sintered ceramic luminescent material is less scattered or absorbed in the screen itself. Furthermore, the sintered ceramic luminescent material is formed in a mechanically strong sheet, so that the materials are easy to prepare. For example, a sheet can be prepared outside the cathode ray tube, and then mount it in the cathode ray tube. Thus, the manufacturing process of the cathode ray tube can be simplified by the invented technique.

The essence of the present invention of the sintered zinc sulfide ceramic material is as follows: A suitable amount of the compound of an alkali metal or alkaline earth metal is added to the zinc sulfide powder, and is well mixed, and then 5 to 10 weight % water is added to make a paste. The sheet is prepared from the paste in a desired form by using a press, and the sheet is heated in an inert or sulfuring atmosphere of normal pressure to convert the sintered zinc sulfide ceramic.

The conditions in detail of the abovementioned process are as follows:

The density of the sintered zinc sulfide ceramic is increased with the amount of the alkali metal compound presenting in an amount greater than 0.1 atom % as alkali metal. The addition of more than 10 atom % of alkali metal is not preferable, because the mixture likely react with alumina and quartz containers during the heat treatment, and also the grain size of the ceramic material becomes unacceptably large, resulting in a low mechanical strength of the material.

FIG. 1 shows a relationship between the concentration of Li (an alkali metal) and relative density, which represents the percentage of actual density against theoretical density. The sintered zinc sulfide ceramic, shown in FIG. 1, is prepared from the mixture of the powder of lithium chloride (LiCl) and zinc sulfide (ZnS), by heating at 1,000° C. for 1.0 hour in hydrogen sulfide.

The density of the sintered zinc sulfide ceramic materials is increased with the addition of alkaline earth metals present in accounts above 0.02 atoms %. The admissible upper limit of the alkaline earth metals is about 3.0 atoms %; above this concentration the mixture reacts with alumina and quartz containers during the heat treatment.

FIG. 2 shows a relationship between the concentration of Ba (as an alkaline earth metal) and relative density which represents the percentage of actual density against theoretical density. The sintered zinc sulfide ceramic, shown in FIG. 2, is prepared from a mixing powder of barium chloride ($BaCl_2$) and zinc sulfide (ZnS), and the mixture is heated at 1,100° C. in hydrogen sulfide as a sulfuring atmosphere.

In the followings, more concrete examples are elucidated.

EXAMPLE 1

The commercial zinc sulfide powder (of grain diameter of 0.1 to 1.5 μm) and 3.0 mol % of sodium chloride as alkali metal compound (namely, atom percentage of the sodium against zinc is 3%) are well mixed in a mortar, and then 5 to 7 weight % of water is added thereto to form a paste. Then the paste is pressed under a pressure of about 800 kg/cm$^2$ to form a disc in a size of 15 mm in diameter and 1.5 mm in thickness; the disc is then fired at 1,200° C. for 1.0 hour in a sulfuring atmosphere such as hydrogen sulfide.

The density of the sintered zinc sulfide ceramic prepared by the abovementioned method is measured to be 92% of the theoretical value.

EXAMPLES 2 TO 18

Many samples of the sintered zinc sulfide ceramic are prepared according to the method described in Example 1, by changing the types and concentrations of the alkali metal compounds and conditions of the heat treatment. The densities of the samples are measured. The results are as shown in Table 1. The densities are represented by the relative densities which are percentages of actual densities against theoretical densities.

TABLE 1

| Example No. | Compounds of alkali metal | | Heat treatment | | | Densities (%) |
|---|---|---|---|---|---|---|
| | kinds | concentration (atom %) | atmosphere | temperature (°C.) | hours | |
| 2 | LiCl | 3.0 | $H_2S$ | 1,000 | 1.0 | 92 |

TABLE 1-continued

| Example No. | Compounds of alkali metal kinds | concentration (atom %) | Heat treatment atmosphere | temperature (°C.) | hours | Densities (%) |
|---|---|---|---|---|---|---|
| 3 | LiOH | 3.0 | H₂S | 1,000 | 1.0 | 91 |
| 4 | LiNO₃ | 3.0 | H₂S | 1,000 | 1.0 | 91 |
| 5 | LiCl | 3.0 | N₂ | 1,000 | 1.0 | 90 |
| 6 | LiCl | 3.0 | Ar | 1,000 | 1.0 | 90 |
| 7 | NaCl | 3.0 | H₂S | 1,100 | 1.0 | 92 |
| 8 | KCl | 3.0 | H₂S | 1,100 | 1.0 | 91 |
| 9 | RbCl | 3.0 | H₂S | 1,100 | 1.0 | 90 |
| 10 | CsCl | 3.0 | H₂S | 1,100 | 1.0 | 90 |
| 11 | LiCl NaCl | 1.0 1.0 | H₂S | 1,100 | 1.0 | 91 |
| 12 | LiCl KCl | 1.0 1.0 | H₂S | 1,100 | 1.0 | 90 |
| 13 | LiCl RbCl | 1.0 1.0 | H₂S | 1,100 | 1.0 | 90 |
| 14 | LiCl CsCl | 1.0 1.0 | H₂S | 1,100 | 1.0 | 90 |
| 15 | LiCl | 3.0 | H₂S | 1,050 | 0.2 | 90 |
| 16 | LiCl | 3.0 | H₂S | 1,050 | 1.0 | 93 |
| 17 | LiCl | 3.0 | H₂S | 1,050 | 3.0 | 94 |
| 18 | LiCl | 3.0 | H₂S | 1,050 | 10.0 | 94 |

EXAMPLE 19

The commercial zinc sulfide powder (of grain diameter of 0.1 to 1.5 μm) and 3.0 mol % of barium chloride as alkaline earth metal compound (namely, atomic percentage of the barium against zinc is 3%) are well blended in a mortar, and 5 to 7 weight % of water is added to form a paste. Then the paste is pressed with a pressure of about 800 kg/cm² to form a disc in a size of 15 mm in diameter and 1.5 mm in thickness. The disc is then fired at 1,100° C. for 1.0 hour in a sulfuring atmosphere such as hydrogen sulfide.

The density of the sintered zinc sulfide ceramic prepared by the abovementioned method is measured as 4.0 gr/cc, which is 98% of the theoretical value.

EXAMPLES 20 TO 32

In similar way to the case of Example 19, many samples of the sintered zinc sulfide ceramic are prepared by changing the kind and concentration of alkaline earth metal compounds and heat treatment conditions. The measured results are as shown in the Table 2. The densities are represented by the relative densities which are percentages of actual densities against theoretical densities.

TABLE 2

| Example No. | Compounds of alkaline earth metal kinds | concentration (atom %) | Heat treatment atmosphere | temperature (°C.) | hours | Densities (%) |
|---|---|---|---|---|---|---|
| 20 | BaCl₂ | 0.03 | H₂S | 1,100 | 1.0 | 92 |
| 21 | BaCl₂ | 0.3 | H₂S | 1,100 | 1.0 | 98 |
| 22 | BaCl₂ | 0.1 | CS₂+N₂ | 1,100 | 2.0 | 97 |
| 23 | BaCl₂ | 0.1 | N₂ | 1,100 | 2.0 | 97 |
| 24 | BaCl₂ | 0.1 | Ar | 1,100 | 2.0 | 97 |
| 25 | BaCO₃ | 0.1 | H₂S | 1,100 | 1.0 | 94 |
| 26 | Ba(OH)₂ | 0.1 | H₂S | 1,100 | 1.0 | 95 |
| 27 | Ba(NO₃)₂ | 0.1 | H₂S | 1,100 | 1.0 | 93 |
| 28 | BaCl₂ | 0.1 | H₂S | 1,100 | 0.2 | 94 |
| 29 | BaCl₂ | 0.1 | H₂S | 1,100 | 10.0 | 97 |
| 30 | BaCl₂ SrCl₂ | 0.1 0.1 | H₂S | 1,200 | 1.0 | 98 |
| 31 | BaCl₂ CaCl₂ | 0.1 0.1 | H₂S | 1,200 | 1.0 | 98 |
| 32 | BaCl₂ MgCl₂ | 0.1 0.1 | H₂S | 1,200 | 1.0 | 98 |

As can be understood from the abovementioned examples, the sintered zinc sulfide ceramic has a high density and can be prepared by only one heat treatment at normal pressure (1 atmosphere) in inert or sulfuring atmosphere, without using expensive equipment or a complicated process.

The present invention provides a useful technique for the mass-production of the devices to which the zinc sulfide ceramic is applied.

In the following, a description is given of cathode ray tubes using the zinc sulfide sintered ceramic as the luminescent screen.

In general in a cathode ray tube, a film reflecting the emitted light and acting as the electrical conductance is formed on one side of a luminescent screen for the purpose of reflecting the light emitted in the luminescent material and also to prevent undesirable negative charge up of the luminescent screen. For this purpose, an ordinary vapor-deposited aluminum film is used; the aluminum film has a thickness of 100 Å to reflect about 60% for light of a wavelength of 5,000 Å, about 85% with 200 Å thickness and above 90% for the film of 300 Å thickness. For prevention of the negatively charging up the luminescence screen, an aluminum film of about 200 Å is sufficient. In the conventional cathode ray tube, however, the thickness of the aluminum film on the luminescent screen is about 1,000 Å to 3,000 Å to assure the mechanical strength to keep a reflection plane bridging the back faces of the particles of the luminescent materials. With this thick aluminum film, the energy loss of the electron beam penetrating through the aluminum film is of a considerably large amount for a cathode ray tube of the low voltage acceleration type, especially the acceleration voltage under 10 kV. The large energy loss of the electron beam in the aluminum film gives rise to less energy for the luminescence screen, resulting in poor brightness of the phosphor screen. For example, in case of an aluminum layer of 1,500 Å in thickness, permeability of electron energy is 76% for acceleration voltage of 10 kV, 62% for acceleration voltage of 7.5 kV and 32% for acceleration voltage of 5 kV. In order to avoid the low permeability of electron beam energy, the aluminum reflection film is often omitted for the cathode ray tube operated at below 5 kV.

According to the present invention, the sufficiently thin reflection and conduction film can be made without harming its mechanical strength. Since the back side of the sheet of the sintered zinc sulfide ceramic, according to the present invention, is of a very smooth plane, the formation of the reflection and conduction film does not require particular rigidity. Thus, the thin reflecting film is easily formed on the sintered zinc sulfide ceramic, i.e. the reduction of the energy loss of the exciting electron beam in the aluminum film. Consequently, we obtain a high brightness at the low accelerating voltage. For example, in the case of 200 Å thick aluminum film having a reflective index of 85%, the permeability for the electron beam energy is 96% for 10 kV acceleration, 94% for 7.5 kV acceleration, 88% for 5 kV acceleration and 67% for 2.5 kV. Thus, even for the low voltage acceleration, the loss of the electron beam energy in the aluminum film is reduced significantly without sacrificing light reflection. The present invention, thus, provides for the use of a thinner aluminum film than those of the conventional cathode ray tube without sacrificing light reflection and electrical conductance. The experimental studies by the inventors show that an aluminum reflection film of less than 1,000 Å thickness can be formed on the sintered zinc sulfide ceramic.

The observed emission intensity from the luminescent screen not only depends on the intensity of electron beam but also the microscopic structure of the luminescent screen, i.e. the energy conversion efficiency of the luminescent screen and the transmission of the emitted light in the screen itself. If the luminescent screen is very thin, less than one layer of particles, the light emitted in the screen comes out from the screen with less scattering and absorption in the screen; however, there are some holes, not covered with the phosphor crystals, and hence, the electron beam through the holes reaches the substrate glass directly without exciting the phosphor crystals, resulting in a poor luminescence observed. If the luminescent screen is thick, the excitation energy of the electron beam is efficiently absorbed in the luminescent screen, but the scattering and absorption of the emitted light in the screen are considerably large. In the conventional luminescent screen, where luminescent powder particles of several $\mu m$ to several tenths $\mu m$ diameter is accumulated randomly, the light transmission is about 50%. In the luminescent screen in accordance with the present invention, the sintered luminescent material screen is dense, and homogeneous and the scattering and absorption are low. Thus, the transmission of the emitted light is drastically improved.

The luminescent material in accordance with the present invention also has a good heat conductance with the highly dense construction, and therefore, temperature rise of luminescent film during the operation is low, thereby avoiding the decrease in the emission efficiency due to the temperature rise.

A method of preparing the sintered zinc sulfide ceramic materials in accordance with the present invention is elucidated hereafter.

A powder of high purity zinc sulfide, a powder of at least one compound of alkali metal or a compound of alkaline earth metal and powder of a luminescent element are mixed together, and the mixture is blended with a known organic resin dissolved in a known organic solvent to form a paste. If necessary, a suitable composition, for example, powder of cadmium sulfide can be added thereto. Using a known sheet forming technique, the paste is formed into a thick sheet of 100–300 $\mu m$ thickness. After vaporization of the organic solvent in the air, the sheet is heated at temperatures between 1,000°–1,100° C. in an inert or sulfuring atmosphere at normal (atmospheric) pressure, thereby to form the sintered sheet and the luminescent centers. After rinsing, a light reflection and electric conduction film, such as an aluminum film, is vapor-deposited on one side of the sheet. For the luminescent element, at least one of the following impurity elements can be used:
additives: Ag, Cu, Au, Mn and Tb,
coadditives: Al, Ga, In, Cl, Br or I.

Thus, a high brightness luminescent screen can be made.

In the cathode ray tube in accordance with the present invention, the sheet of the sintered zinc sulfide ceramic material can be simply installed on the face panel inside the tube by known suitable means, for example fixing by a metal frame, bonding onto the face panel by edges thereof, etc. The method of preparing a luminescent screen in accordance with the present invention avoids the previously required steps of spraying the luminescent slurry and forming an organic film on the back face of the luminescent film.

When a highly pure zinc sulfide powder is used for the starting material, the luminescent sheet of a very low light absorption is obtainable. The light transmission is related to the thickness of the ceramic sheet and scattering and absorption of light. By containing additives of at least one alkali metal and alkaline earth metal and utilizing the technique of sheet forming, the light transmission of the luminescent sheet is 60–90%.

According to the present invention, zinc sulfide can be partially substituted by zinc selenide or cadmium sulfide and cadmium selenide and the like which forms the solid-solution with zinc sulfide.

An example of cathode ray tube embodying the present invention is elucidated hereafter.

EXAMPLE 33

Figure 3:
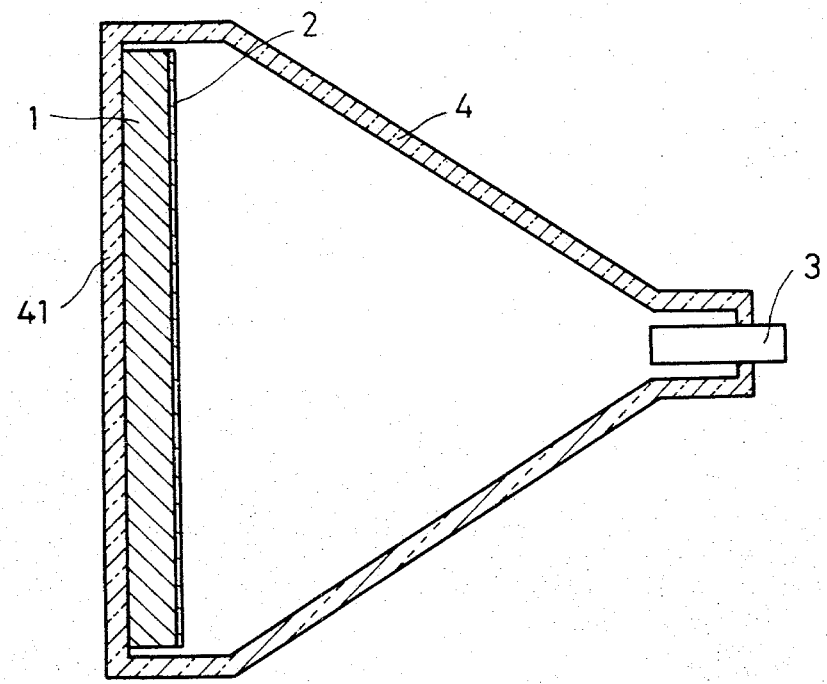
FIG. 3 is a sectional side view of a cathode ray tube embodying the present invention.
Figure 4:
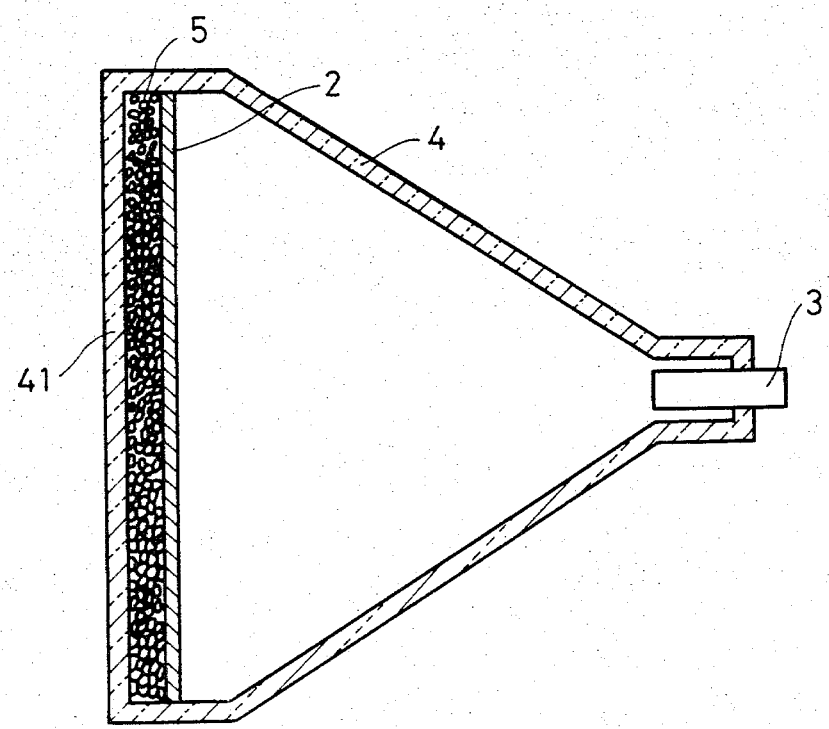
FIG. 4 is a sectional side view of a cathode ray tube of the conventional type.

A small amount of powder of copper and aluminum as luminescent impurities are added to the commercial high purity zinc sulfide powder. Lithium chloride of 1.5 atom % and sodium chloride of 1.5 atom % with respect to the zinc sulfide, as sintering acceleration agent, are added to the above mixture and the mixture is blended. By utilizing a known sheet forming technique, a raw sheet of 100 $\mu m$ thickness is made. After evaporating the organic solvent in air, the sheet is heated at 1,050° C. for 2.0 hours in a sulfuring atmosphere of hydrogen sulfide, thereby a sintered zinc sulfide ceramic sheet is obtained. After washing the sintered ceramic sheet, the sheet is dried. A 500 Å thick aluminum film is deposited on one side of the sheet. Then, as shown in FIG. 3, sheet 1 is installed on a face panel 41 inside a vacuum enclosure 41 of a cathode ray tube, thereby making a cathode ray tube shown in FIG. 3, wherein numerals 2 and 3 designate the aluminum reflection and conduction film and an electron gun, respectively. FIG. 4 shows a conventional type cathode ray tube which comprises a vacuum enclosure, 1,500 Å thick aluminum reflection and conduction film 2 formed on a conventional type porous luminescent screen 5 of zinc sulfide powder and an electron gun 3. Comparison data of the abovementioned two cathode ray tubes of FIG. 3 and FIG. 4 is shown in Table 3.

TABLE 3

| | relative emission brightness | | |
|---|---|---|---|
| Acceleration Voltage | 15kV | 8kV | 4kV |
| Present Invention (FIG. 3) | 100 | 100 | 100 |
| Prior Art (FIG. 4) | 88 | 74 | 26 |

EXAMPLE 34

A powder of a commercial high purity zinc sulfide and a powder of a high purity cadmium sulfide as the base material, a small amount of gold, silver and aluminum as the luminescent impurity and barium nitrate of 0.1 atom % with respect to sum of zinc and cadmium, as sintering accelerating agent, are mixed. The mixture is formed in a pair of 150 μm thick raw sheets by employing known sheet forming process. After evaporation of organic solvent in air, the raw sheets are heated at 1,100° C. for 1 hour in a hydrogen sulfide atmosphere. Thus, two sheets of the sintered zinc-cadmium sulfide ceramic material are obtained. After rinsing the ceramic sheets, the aluminum films in 200 Å and 1,000 Å thick are vapor-deposited on one side of the ceramic sheets, and cathode ray tubes of the construction of FIG. 3 are made, by employing one of the abovementioned ceramic sheets. For comparison's sake, a cathode ray tube of the construction of FIG. 4 is made by utilizing a known luminescent powder of (Zn,Cd)S:Au,Ag,Al and with a 1,000 Å thick aluminum film. Data of the comparison tests of the abovementioned cathode ray tubes are shown in Table 4.

TABLE 4

|  | Aluminum thickness | relative emission brightness Acceleration Voltage | | |
|---|---|---|---|---|
|  |  | 10kV | 6kV | 2kV |
| Present Invention (FIG. 3) | 1,000Å | 90 | 70 | no emission |
|  | 200Å | 100 | 100 | 100 |
| Prior Art (FIG. 4) | 1,000Å | 75 | 55 | no emission |

As shown in the abovementioned comparison table, the cathode ray tube in accordance with the present invention has as a luminescent screen a sintered zinc sulfide ceramic sheet which has a smooth surface and dense and continuous construction. Due to the abovementioned characteristics of the ceramic sheet, the emission brightness is improved, especially the operation at a low accelaration voltage, thereby being suitable for an energy saving type cathode ray tube.

What we claim is:

1. Particles of zinc sulfide sintered ceramic material adapted for use as the luminescent screen in a cathode ray tube consisting essentially of zinc sulfide and at least one element selected from the group consisting of Ca, Sr and Ba.

2. The zinc sulfide sintered ceramic material in accordance with claim 1 further containing luminescent impurities therein.

3. Particles of zinc sulfide sintered ceramic material adapted for use as the luminescent screen in a cathode ray tube, said material consisting essentially of zinc sulfide;
    at least one element selected from the group consisting of Ca, Sr and Ba;
    at least one activator selected from the group consisting of Au, Ag, Cu, Mn and Tb; and
    at least one co-activator selected from the group consisting of Al, Ga, In, Cl, Br and I.

4. The zinc sulfide sintered ceramic material in accordance with claim 1 or 3 wherein said at least one element is present in an amount of from 0.02 to 3.0 percent of the zinc metal.

5. The zinc sulfide sintered ceramic material in accordance with claim 1 or 3 wherein said at least one element is Ba.

6. A cathode ray tube including as the luminescent screen a layer of particles of a zinc sulfide sintered ceramic material which consists essentially of zinc sulfide and at least one element selected from the group consisting of Ca, Sr and Ba.

7. The cathode ray tube in accordance with claim 6 further containing luminescent impurities therein.

8. A cathode ray tube including as the luminescent screen therein a layer of particles of a zinc sulfide sintered ceramic material which consists essentially of:
    zinc sulfide;
    at least one element selected from the group consisting of Ca, Sr and Ba;
    at least one activator selected from the group consisting of Au, Ag, Cu, Mn and Tb; and
    at least one co-activator selected from the group consisting of Al, Ga, In, Cl, Br and I.

9. The cathode ray tube of claim 8 wherein said luminescent screen has an aluminum film less than 1,000 Angstroms in thickness thereon.

10. The cathode ray tube of claims 6, 8 or 9 wherein said at least one element is present in an amount of from 0.02 to 3.0 percent of the zinc metal.

11. The cathode ray tube of claim 6, 8 or 9 wherein said at least one element is Ba.

12. A luminescent screen adapted for use in a cathode ray tube, said screen comprising:
    a smooth, thin film of a dense, homogeneous zinc sulfide sintered ceramic material consisting essentially of:
    zinc sulfide;
    Ca, Sr, Ba or mixtures thereof present in an amount of from 0.02 to 3.0 percent of the zinc metal;
    Au, Ag, Cu, Mn, Tb or mixtures thereof as an activator;
    Al, Ga, In, Cl, Br, I or mixtures thereof as co-activator; and
    an aluminum conductive/reflection film of less than 1,000 Angstroms in thickness deposited on said film of ceramic material.

13. The luminescent screen of claim 12 wherein the aluminum conductive layer is no greater than 200 Angstroms in thickness and said screen exhibits a relative emission brightness of about 100% when subjected to an acceleration voltage in the range of about 2 kV to about 10 kV.

14. The luminescent screen of claim 12 wherein the relative density, expressed as a percentage of actual density over theoretical density, if from about 92% to about 97%.

15. The luminescent screen of claim 12 or 14 wherein the amount of Ca, Sr, Ba or mixtures thereof is from 0.1 to 0.3 percent.

* * * * *